UNITED STATES PATENT OFFICE.

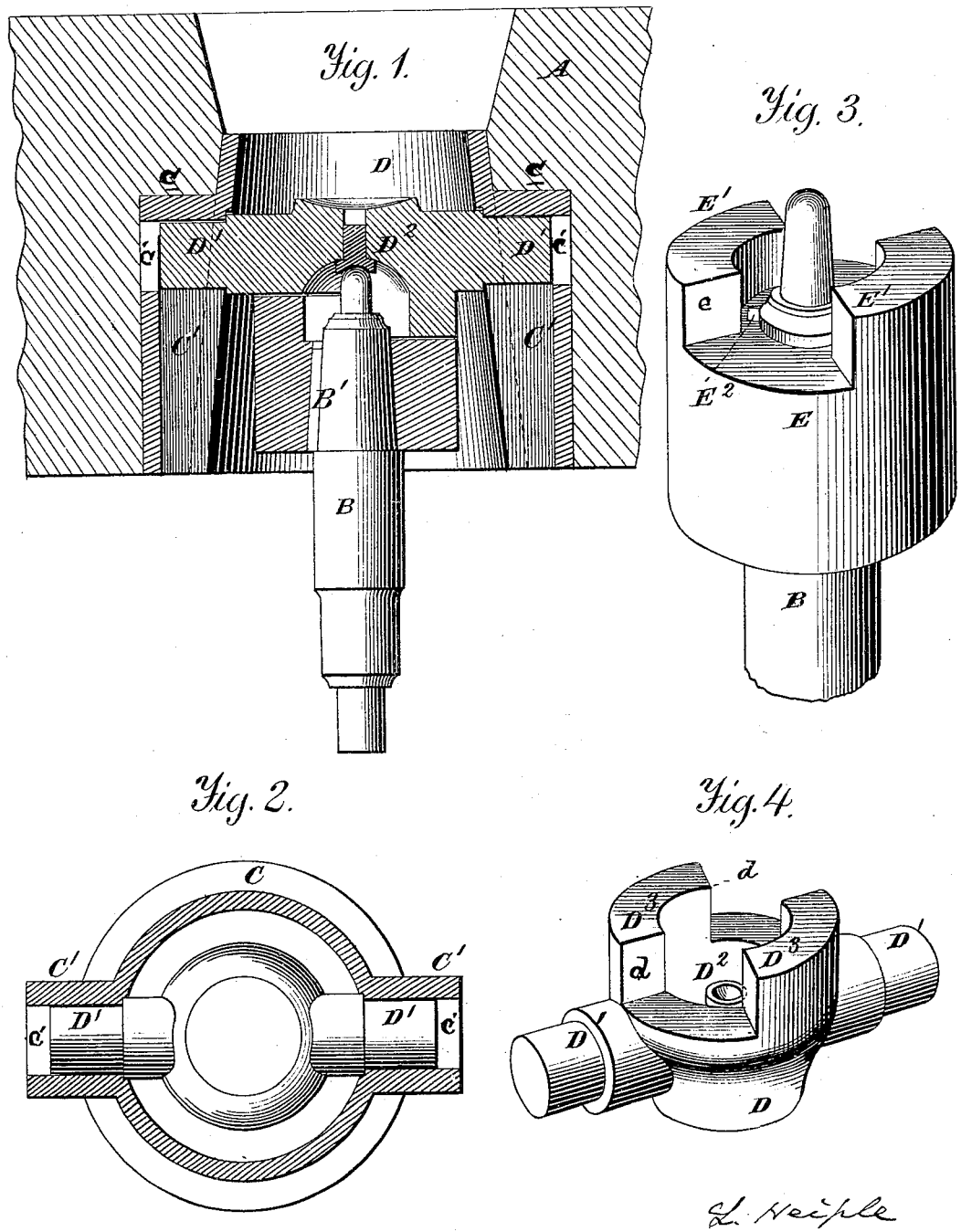

LEVI HEIPLE, OF BELLEVILLE, OHIO, ASSIGNOR TO THE LIMA MACHINE WORKS, OF LIMA, ALLEN COUNTY, OHIO.

MILLSTONE-DRIVER.

SPECIFICATION forming part of Letters Patent No. 249,834, dated November 22, 1881.

Application filed April 28, 1879.

*To all whom it may concern:*

Be it known that I, LEVI HEIPLE, of Belleville, in the county of Richland and State of Ohio, have invented certain new and useful Improvements in Millstone-Drivers; and I do hereby declare that the following is a full, clear, and exact description of the invention, which will enable others skilled in the art to which it appertains to make and use the same.

My invention relates to millstone-drivers; and it consists in a balance-rynd and driver constructed and operated in the following described manner.

The object of my invention is to provide a cheap, effective, and durable balance millstone-driver, and one that admits of accuracy in its construction and simple and certain automatic adjustment of its parts upon the replacement of the upper stone.

In the drawings making a part of this specification, Figure 1 is a vertical section of the driver when applied to the burr. Fig. 2 is a plan view, partly in section, showing the bearings in the balance-rynd for the trunnions of the driver. Fig. 3 is a perspective view of the spindle and driving-clutches. Fig. 4 is a perspective view, in inversion, of the driver connecting the spindle with the balance-rynd.

The same letters and numerals are employed in all the figures in the indication of identical parts.

A is the upper or driven burr or stone in operative position. B is the driving-spindle. C is the balance-rynd, which is in the form of the hollow frustum of a cone, constructed of suitable size to be properly set into the common eye of the upper millstone. Upon opposite sides of this balance-rynd are flanged projections C' C', the outer walls of which are parallel with the axis of the cone-frustum of the balance-rynd. The walls of these projections are of uniform thickness with the wall of the balance-rynd, and form at their summit the bearings $c$ for the trunnions D' of the driver D. The spaces formed by these flanged projections are suitable for the free admission of the driver D and its trunnions into their bearings in the balance-rynd. In the outer or axial walls of these projections are openings $c'$, for the admission of suitable instruments to properly dress the bearings $c$.

The driver D is provided with the bearing and driving trunnions D', which receive the weight of the upper burr and communicate motion to the same; and it is also provided with a socket, $D^2$, which is a piece of suitable metal, preferably steel, inserted into the centrally-located cavity of the driver in such a manner that the summit of the spindle B, resting in it and receiving the weight of the upper stone, will be on, or nearly on, the axial line of the trunnions D' of the driver. The driver is also provided with the interlocking lugs $D^3 D^3$.

The driving clutch-box E is suitably attached to the spindle B by means of the spline B', and is provided with the interlocking lugs E' E', suitable for engaging the lugs $D^3 D^3$ of the driver D.

The construction of the driver D is such as to admit of the operative faces $d$ of the driving-lugs $D^3 D^3$ being accurately dressed on a line at once radial and parallel with the axial line of the trunnions. The driving-faces $e$ of the lugs E' of the driver clutch-box E are also dressed upon the radial and axial lines of the spindle.

The parts are so constructed that when in operative position there is a space between all of the inoperative faces of the lugs of the clutch-box E and those of the driver D, to admit of the easy automatic adjustment of the driver D.

In operation, the first impulse of the lugs of the clutch-box upon those of the driver D, constructed and operated as described, automatically adjusts the driver into proper position with the spindle and retains it in that position while in operation, thus contributing to a uniform and an accurate balance of the upper burr.

Having thus described my invention, what I deem new, and desire to secure by Letters Patent, is—

In a millstone-driver, the balance-rynd C, constructed in the form of a hollow frustum of a cone, and provided with the projections C' C', openings $c'$ $c'$, and trunnion-bearings $c$, in combination with the driver D, provided with the trunnions D' D', the spindle-socket D², driving-lugs D³ D³, with dressed faces $d\ d$, and the clutch-box E, provided with the driving-lugs E', having dressed faces $e$, as and for the purposes substantially as set forth.

In testimony that I claim the foregoing as my own I affix my signature in presence of two witnesses.

LEVI HEIPLE.

Witnesses:
 A. S. GRAHAM,
 F. T. McHENRY.